United States Patent [19]
Barefoot

[11] Patent Number: 5,269,594
[45] Date of Patent: Dec. 14, 1993

[54] LOAD RESPONSIVE AIR BRAKE CONTROL VALVE FOR PROVIDING CONTINUOUSLY VARIABLE BRAKE PRESSURE

[75] Inventor: Richard Barefoot, Greenville, S.C.

[73] Assignee: Ellcon National, Inc., Greenville, S.C.

[21] Appl. No.: 809,293

[22] Filed: Dec. 17, 1991

[51] Int. Cl.⁵ .............................................. B60T 8/18
[52] U.S. Cl. .................................. 303/22.2; 303/22.8
[58] Field of Search ................. 303/22.2, 22.3, 22.7, 303/22.8, 9.69; 188/195

[56] References Cited

U.S. PATENT DOCUMENTS

| | | | |
|---|---|---|---|
| 2,991,801 | 7/1961 | Larsson | 303/22.2 X |
| 4,648,661 | 3/1987 | Schmitt et al. | 303/22.2 |
| 4,844,554 | 7/1984 | Rojecki | 303/22.2 X |
| 5,005,915 | 4/1991 | Hart et al. | 303/22.2 |

*Primary Examiner*—Robert J. Oberleitner
*Assistant Examiner*—Lee W. Young
*Attorney, Agent, or Firm*—Brooks Haidt Haffner & Delahunty

[57] ABSTRACT

A braking force control valve responsive to the load on a vehicle has a three-part body with a central bore with a spring-biased proportioning spool disposed within the central bore and with a pair of side control chambers for receiving air when the spool is displaced. The spring bias on the spool is controlled by a plunger, the position of which is controlled by the load on the car via a load-sensing arm. The valve may be mounted either so that the position of the plunger is determined by lading itself or variably by the load weight. The body has an inlet port which is connected to the braking air source and an outlet port connected to the brake cylinder. The passage of air from the inlet port to the outlet port is controlled by the proportioning spool, which is urged from a closed position in which it prevents passage of air from the inlet port to the outlet port by the spring pressure applied thereto and is urged into such closed position by the pressure of the air in the control chambers. Thus, the pressure of the air supplied to the outlet port is a continuously variable proportion of the pressure of the air supplied to the inlet port. A check valve permits air to be exhausted from the control chamber side of the spool and the brake cylinder when the supply of air to the inlet port is discontinued.

11 Claims, 3 Drawing Sheets

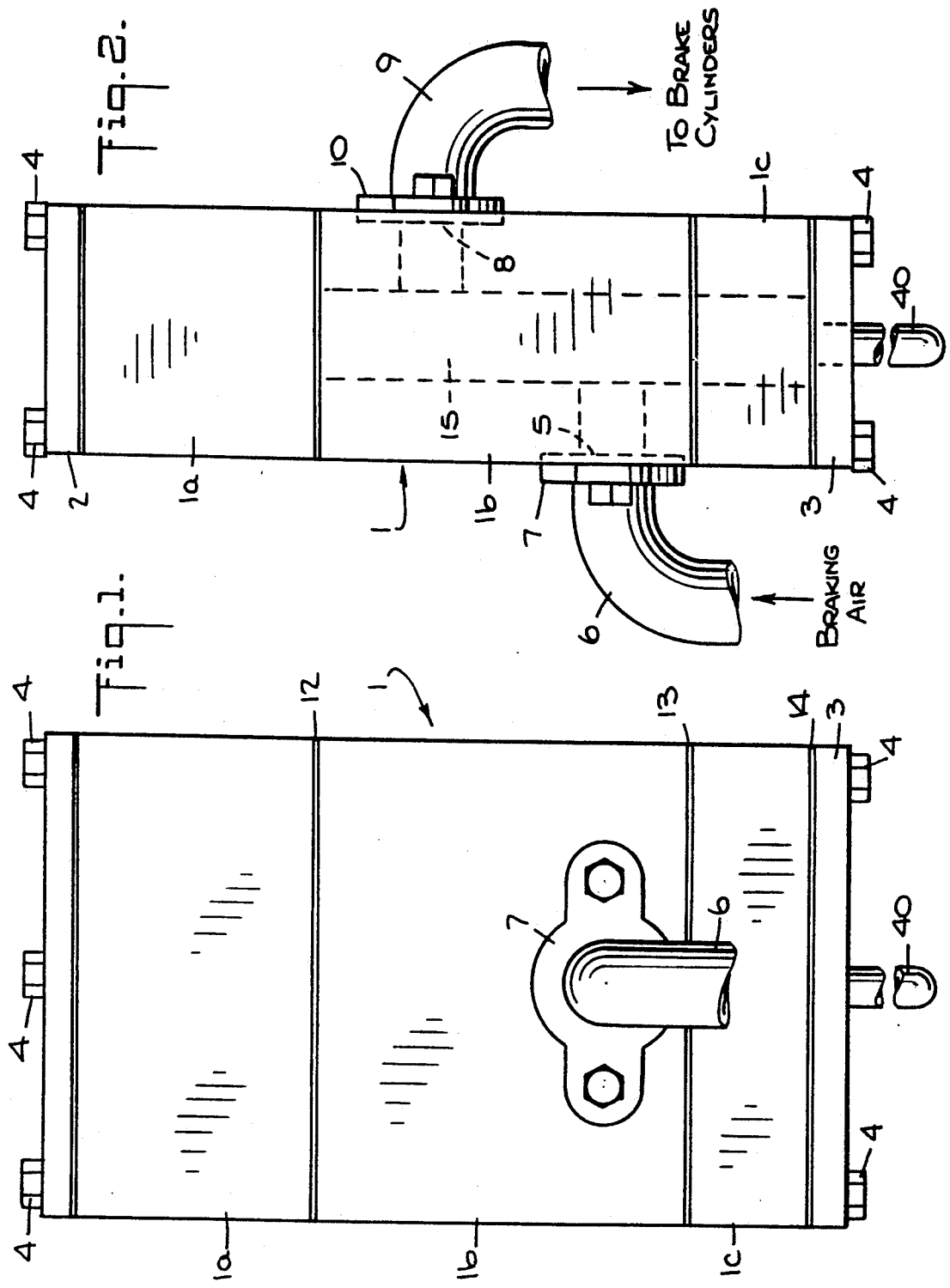

LOAD RESPONSIVE AIR BRAKE CONTROL VALVE FOR PROVIDING CONTINUOUSLY VARIABLE BRAKE PRESSURE

RELATED APPLICATIONS

This application is related to U.S. application Ser. No. 452,279 filed Dec. 15, 1989 and entitled "Empty/Load Braking System For Railroad Cars And Valve Therefor" and now U.S. Pat. No. 5,039,174 and to application Ser. No. 605,681, filed Oct. 30, 1990 and entitled "Protective Cover for Empty/Load Valve Actuator", now U.S. Pat. No. 5,192,119.

BACKGROUND OF THE INVENTION

The invention relates to a valve for controlling the pressure of a fluid, such as air, which is applied to a brake cylinder of a vehicle, particularly, a railway car, and which can be continuously variable in dependence on the load on such vehicle.

Braking systems for railway cars in which the braking force applied to the wheels of all the trucks of a car or to the wheels of individual trucks dependent upon the load on the car or on the individual trucks are known in the art. See, for example, U.S. Pat. Nos. 1,615,366; 4,648,661; 4,775,197 and the patents cited in the application therefor; and U.S. Pat. Nos. 4,826,259 and 5,039,174.

In general, such prior art valves provide reduced braking force when the railway car is empty or only lightly loaded and require a reservoir to which air is diverted under such conditions. When the car loading is increased and reaches a predetermined value, e.g. a load which causes one-half of the car spring travel, the valves change over to a condition in which full braking force is applied. In other words, such valves provide only two different braking forces, a low force for a light load and a high force for a heavy load. Such valves also require an equalizing reservoir or canister of an internal volume sufficient to reduce the air pressure supplied to the valve to a value at the brake cylinder which will produce the desired low force.

In cases such as coal or other bulk commodity cars which generally are fully loaded or completely empty when moved, current systems are satisfactory. In cases of container, box, gondola or bulk type cars which carry light materials when fully loaded in one service, and dense or heavy material when loaded with some other commodity in another service, the current, strictly empty or load devices, will not provide the optimum braking performance.

SUMMARY OF THE INVENTION

One object of the invention is to provide a braking force control valve responsive to the load on a vehicle which continuously varies the braking force from a low value with light loading to the full and high braking force when the car is heavily loaded.

Another object of the invention is to provide such a valve which can also be used in the conventional manner, i.e. provide only low braking force with light loading and full, high braking force when the loading exceeds a predetermined value less than full loading of the vehicle.

A further object of the invention is to provide such a value which does not require a prior art type of equalizing reservoir or canister.

In the preferred embodiment of the invention, the valve unit comprises a three-part body having a central bore in which a spring biassed proportioning spool is disposed and having a pair of side control chambers for receiving air when the spool is displaced. The spring bias on the spool is controlled by a plunger, the position of which is controlled by the load on the car. The body has an inlet port which is connected to the braking air source, e.g. the conventional ABDW valve, and an outlet port which is connected to the brake cylinder. The passage of air from the inlet port to the outlet port is controlled by the proportioning spool which is urged from a closed position in which it prevents passage of air from the inlet port to the outlet port by the spring pressure applied thereto and is urged into such closed position by the pressure of the air in said control chambers. Thus, the pressure of the air supplied to the outlet port is a continuously variable proportion of the pressure of the air supplied to the inlet port. A check valve permits air to be exhausted from the control chamber side of the spool and the brake cylinder when the supply of air to the inlet port is discontinued and hence, when the brakes are released.

If the valve body is mounted so that the position of said plunger is determined by the weight of the loading on the car, e.g. the spacing between the car bolster and the truck frame, the braking pressure will vary with such weight, a heavier weight causing an increase in braking pressure.

If the valve body is mounted so that the plunger is operated by the lading itself, e.g. such as on a container car with the plunger operable by a container when it is loaded on the car, then, the valve will provide light braking force when there is no lading on the car and will provide full, high braking force when any lading of significant weight is supplied to the car.

BRIEF DESCRIPTION OF THE DRAWINGS

Other objects and advantages of the present invention will be apparent from the following detailed description of the presently preferred embodiments thereof, which description should be considered in conjunction with the accompanying drawings in which:

FIGS. 1 and 2 are front and side elevation views of the control valve of the invention;

DETAILED DESCRIPTION OF EMBODIMENTS OF THE INVENTION

Figure 4:
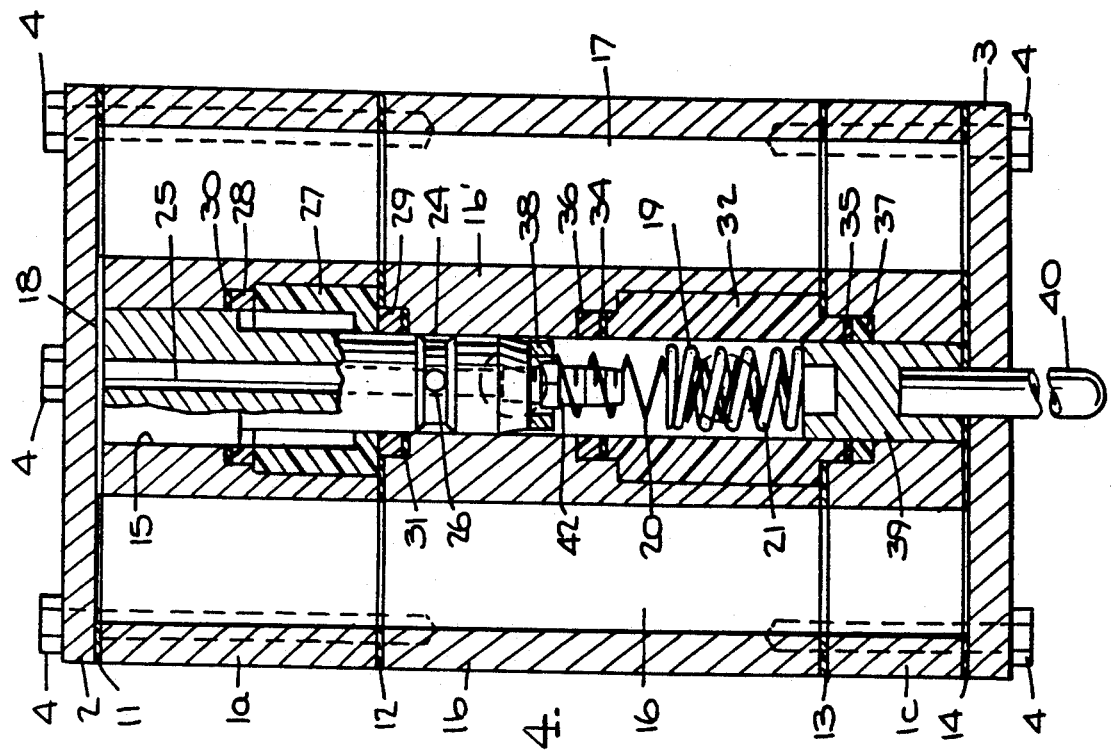
FIG. 4 is a front elevation view, mainly in cross-section, of the control valve of the invention with the parts in the open position of the valve and is taken along the line 4—4 in FIG. 3.

Although the invention has other applications, the invention will be described in connection with the control of braking force applied to the wheels of a railway car, the brakes being operable by an air actuated piston and cylinder assembly and the air being supplied to the valve through a conventional ABDW valve from a reservoir of fixed volume.

With reference to FIGS. 1 and 2, the valve of the invention comprises a housing or body 1 which, for ease of manufacture, comprises three parts 1a, 1b and 1c, made of steel, but of course, such construction is not necessary. The body 1 has end caps 2 and 3 which are secured to the parts 1a-1c which are secured to each other by bolts 4.

Braking air from the ABDW valve is supplied to the valve to an inlet port 5 by way of a conventional hose 6 secured to the body part 1b by a conventional flange 7. Air at the desired pressure is supplied by way of an outlet port 8 to a hose 9 which extends to a brake cylinder (not shown) for actuation of the brake rigging and hence, application of brake shoes to the wheels of a truck. The hose 9 is secured to the body part 1b by a conventional flange 10.

Figure 3:
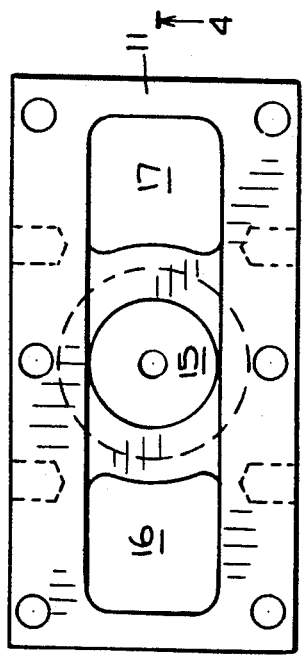
FIG. 3 is a top view the control valve shown in FIGS. 1 and 2 with the cover removed.

Between the parts 1a-1c and the end caps 2 and 3, there are sealing gaskets 11, 12, 13 and 14. The body parts 1a-1c have a central bore 15 which is isolated for air flow from the side control chambers 16 and 17 by the gaskets 12-14, but the shape of the gasket 11 is as shown in FIG. 3 and permits air to flow from the upper end of the central bore 15 into the control chambers 16 and 17.

With reference to FIG. 4, which shows the valve parts in their positions when air is free to flow from the inlet port 5 to the outlet port 8 by way of a portion of a passageway formed, in part, by the bore 15, a reciprocal proportional spool 18 is disposed in the bore 15 and is urged into its uppermost position (as viewed in FIG. 4) by resilient means in the form of a spring assembly 19 comprising an inner, weaker helical spring 20 and an outer, stronger helical spring 21.

Figure 7:
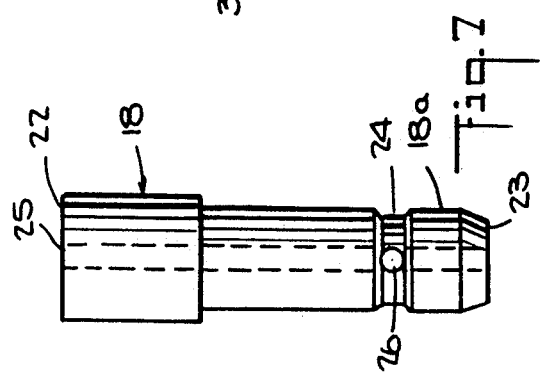
FIG. 7 is an elevation view of the spool used in the control valve of the invention.

The proportional spool 18 is shown in elevation in FIG. 7 and comprises a metal body with an upper end surface 22 of a diameter larger than the diameter of a lower end surface 23. The spool 18 has a passageway for supplying air at the pressure of the air at the outlet port 8 to the control chambers 16 and 17 which is formed by an annular groove 24, a bore 25 and a diametral channel or opening 26 which permits air to flow from the groove 24 into the bore 25. Alternatively, the groove 24, the bore 25 and the opening 26 could be omitted, and air at the pressure of the air at the outlet port can be supplied to the control chambers 16 and 17 through an opening or openings extending radially through the wall portion 1b' of the part 1b above the sealing ring 36, hereinafter described, from the cavity adjacent the outlet port 8 to the control chamber 16 and/or 17.

Figure 9:
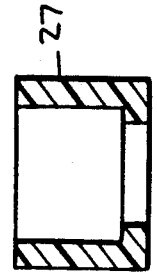
FIGS. 8, 9 and 10 are cross-sectional, elevation views of, respectively, the lower spacer, the upper spacer and the plunger receiver forming part of the control valve of the invention.

The spool 18 is encircled by an upper spacer 27 (see FIGS. 4 and 9) which engages annular rings 28 and 29 at its opposite ends. A sealing gasket 30 is interposed between the upper end of the ring 28 and the body part 1a and a sealing gasket 31 is interposed between the lower end of the ring 29 and the body part 1b. Each of the spacers 27 and the rings 28 and 29 can be made of an acetal resin sold under the trademark DELRIN.

Figure 8:
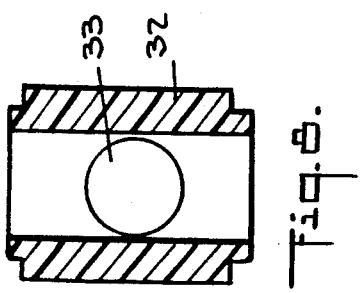
Figure 6:
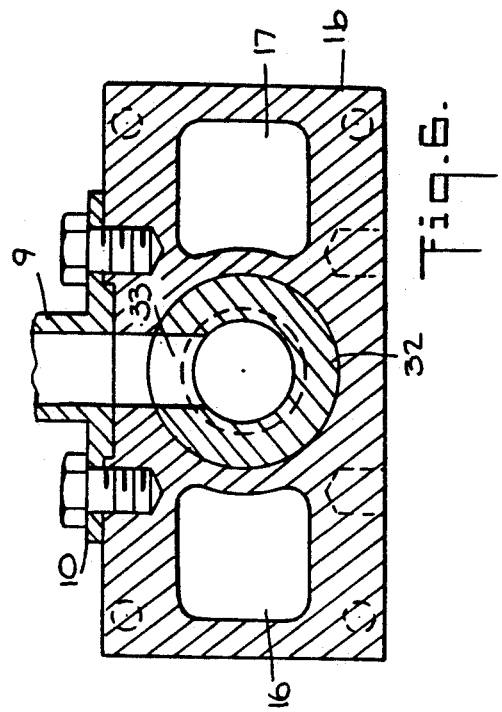
FIG. 6 is a horizontal cross-section of the control valve shown in FIG. 5 with parts omitted for ease in illustration and is taken along the line 6—6 in FIG. 5.

The bore 15 also contains a lower spacer 32 (see FIGS. 4 and 8) which has a diametral opening 33 which permits air to flow from the inlet port 5 into the cavity below the lower end of the spool 18. The spacer 32 engages sealing gaskets 34 and 35 interposed, respectively, between the upper end of the spacer 32 and an annular sealing means or ring 36 which engages the body part 1b and between the lower end of the spacer 32 and an annular ring 37 which engages the body part 1c. Each of the spacer 32 and the rings 36 and 37 can be made of an acetal resin sold under the trademark DELRIN.

An annular ring 38 (FIG. 4), which can also be made of said acetal resin, is interposed between the upper end of the spring 20 and the lower surface 23 of the spool 18.

Figure 10:
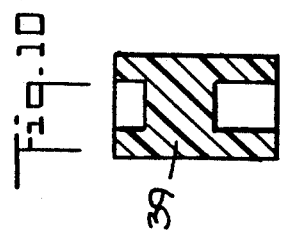

The lower ends of the springs 20 and 21 abut a reciprocal plunger assembly comprising an outer part 39 (see FIGS. 4 and 10), which also can be made of said acetal resin, with a rod 40 secured thereto, such as by a force fit. The rod 40 can be made of metal or plastic and is the load sensing part which is positioned in the manner described in the art in accordance with the load or lading on the car. For example, the rod 40 corresponds to the rod 8 or 8a shown and described in U.S. Pat. No. 5,039,174 or the rod 8 shown and described in said application Ser. No. 605,681.

The plunger assembly is slidable in the bore 15 and is urged downwardly by the springs 20 and 21. Downward movement of the plunger assembly is limited by engagement of the outer part 39 with the gasket 14 or the cap 3. As the rod 40 is moved upwardly, the rod 40, through the springs 20 and 21, increases the upward force on the spool 18 and hence, the air pressure required to move the spool downwardly.

Although two springs 20 and 21 are shown, they could be replaced by a single conventional spring of a variable force per unit of compression. When no air is supplied to the inlet port 5 and the plunger assembly is in its lowermost position, only the lighter force, inner spring 20 engages the ring 38 which bears against the lower surface 23 of the spool 18 and merely retains the spool 18 on its upper, or open position. If, for example, the inner spring 20 extends one-half inch above the upper end of the outer spring 21 in its uncompressed condition, the inner spring 20 delivers 12.5 pounds of force per inch of compression and the outer spring 21 delivers 85 pounds of force per inch of compression, then, the spool 18 will have to move downwardly, or the rod 40 will have to move upwardly, by about one-half inch before the upward force on the spool reaches about 6 pounds. Thereafter, the upward force on the spool 18 increases rapidly, e.g. if the relative movement between the spool 18 and the rod 40 is five-eighths inch, the upward force on the spool 18 would be approximately eighteen and one-half pounds. With the spool dimensions given hereinafter, this would mean that with an air pressure of approximately 31 psi at the inlet port 5 would be required to close the valve and the air pressure at the outlet port 8 would be approximately 18.5 psi. It is apparent that as the rod 40 continues to move upwardly, the air pressure at the outlet port 8 will increase correspondingly until the spool 18 can no longer move downwardly with the air pressure supplied to the inlet port 5, and the full pressure of the air supplied to the inlet port 5 will flow directly to the output port 8 and hence, to the brake cylinder.

Figure 5:
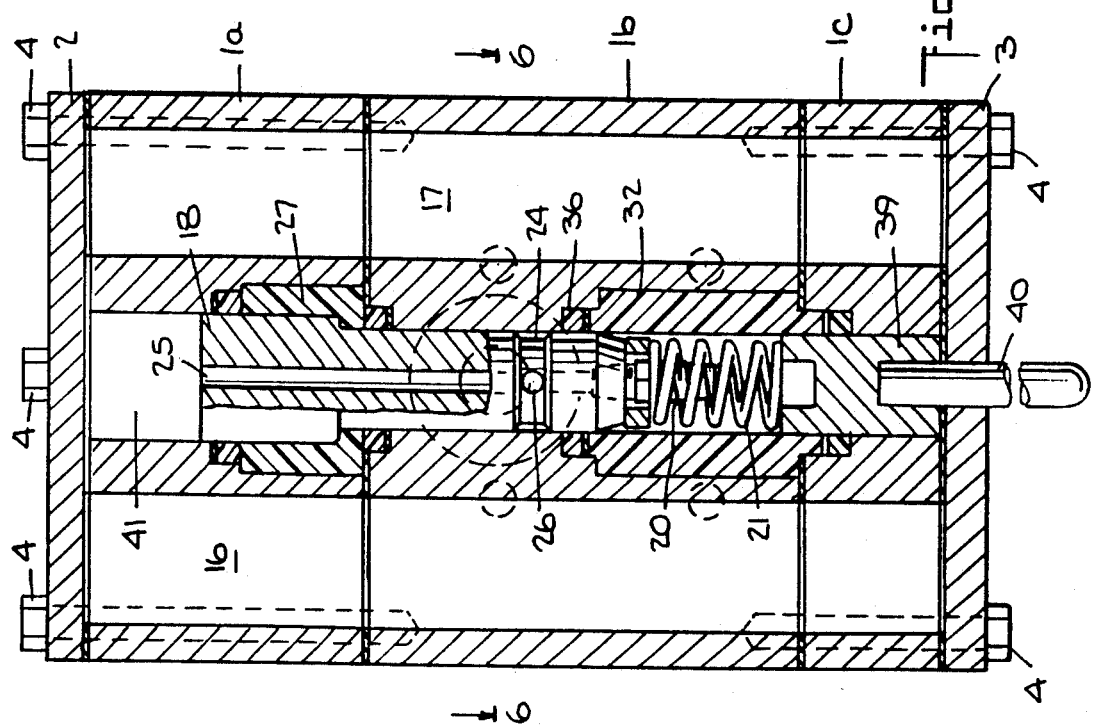
FIG. 5 is similar to FIG. 4 but shows the parts in the closed position of the valve and is taken along the line 4—4 in FIG. 3.

Let it be assumed that the brakes have been previously released so that the pressure of the air at the inlet port 5 is at atmospheric pressure and that the rod 40 is fully extended, i.e. it is not depressed by load. In such situation, the valve parts previously described will be in the positions shown in FIG. 4 because of the springs 20 and 21. When air under pressure (brake application) is supplied to the inlet port 5, it flows upwardly to the outlet port 8 and into the groove 24 and through the opening 26 and the bore 25 into the space above the upper end surface 22 and hence, into the control chambers 16 and 17. As the air pressure above the surface 22 increases, the spool 18 moves downwardly against the force of the spring 20 and assumes the position shown in FIG. 5. In such position, the surface 18a of the spool 18 engages the sealing ring 36 and prevents further flow of air from the inlet port 5 to the outlet port 8 so that the air flow is cut off, for example, when the braking air pressure in the brake cylinder is approximately 18.5 psi. Typically, the brake cylinder air pressure is about 50–60% of the pressure of the air supplied to the inlet port 5 with light load. To accomplish a pressure of 18.5 psi, the spring 20 can be as described, the diameter of the upper end surface 22 can be 1.376 inches and the diameter of the lower end surface 23 can be 0.938 inches tapering outwardly and upwardly to 1.062 inches.

Although the valve body is provided with control chambers 16 and 17, the purpose thereof is entirely different from the equalizing reservoir or canister of prior art valves, and the volume thereof is small as compared to prior art equalizing reservoirs or canisters. For example, each control chamber 16 and 17 may have a square cross-section 1.4 inches on each side and a length of 9.161 inches providing a total volume of 17.95 cubic inches. The purpose of the control chambers 16 and 17 is to permit the spool 18 to move upwardly from the position shown in FIG. 5 with the air in the cavity 41 flowing into the chambers 16 and 17 as the spool 18 moves upwardly.

Upon release of the brakes, i.e., reduction of the air pressure at the inlet port 5, air flows from the brake cylinder by way of the hose 9 to the outlet port 8 and hence, to the inlet port 5 and exhausted therefrom in a known manner by the apparatus connected to the hose 6.

At a point in the release action, the air pressure in the cavity 41, and hence, at the outlet port 8 will be greater than the air pressure at the inlet port 5 and the spool 18 is provided with a check valve 42 (see FIG. 4) which permits air to flow out of the cavity and around the spool 18 and through the inlet port 5 thereby permitting the spool 18 to move into the open position shown in FIG. 4 under the action of the spring 20.

However, if full braking force were applied prior to the release of the brakes, the spool 18 would be in its open position (FIG. 4). In this case, the spool 18 would, at some point in the brake release, move to its closed position, but soon thereafter, the air would be exhausted through the check valve 42 and the spool 18 would move to its open position as described. If the proportioning spool 18 is modified as set forth hereinbefore, only the upper portion of the bore 25 can be omitted for the check valve 42 to operate in this manner. However, the check valve 42 could be mounted other than on the spool 18 and in a position such that it interconnects the cavity adjacent the outlet port 8 with the inlet port 5 for air flow therebetween when the spool 18 is in its closed position during brake release.

It will be apparent from the foregoing description that as the rod 40 is moved upwardly, as seen in FIG. 4, from its light load position because of an increased load on the car, the braking air pressure will increase due to the increased force applied to the spool 18 by the springs 20 and 21. Accordingly, the braking air pressure, and hence, the braking force, is continuously increased from a value at light load to larger values with heavier loads until full braking force is applied with a predetermined heavy load on the car. Therefore, the braking force does not have only two values, one for a light load and one for a load above a predetermined value.

However, as mentioned hereinbefore, the rod 40 could be mounted so as to be subjected to the weight of the lading itself. See, for example, U.S. Pat. No. 3,960,411 or in the case of a container car, operable by a container placed on the car. In such case, the braking force would not depend on the car spring compression, and the braking force would change from a light load force to a full load force upon deposit on the car of lading having a weight substantially less than the weight required for full braking force in the arrangement previously described.

It is particularly advantageous to use an arrangement in which the rod 40 is operated by a container when, as is frequently the case, articulated cars are used to carry containers. Generally, such articulated cars are equipped with truck mounted brakes and one truck or bogey shares the support for one end of each of two adjacent container body units. Even though it may be empty, one container generally provides enough weight to justify applying full braking force to the associated truck wheels without damage to such wheels.

Although preferred embodiments of the present invention have been described and illustrated, it will be apparent to those skilled in the art that various modifications may be made without departing from the principles of the invention.

I claim:

1. A valve for continuously varying the pressure of fluid supplied to fluid operable braking apparatus on a vehicle in accordance with the load on said vehicle, said vehicle having load variable means actuable by the load on said vehicle, said valve comprising:

a housing having an inlet port for connection to a source of fluid under a predetermined pressure, an outlet port spaced from said inlet port for connection to fluid braking apparatus of said vehicle, a first fluid passageway extending from said inlet port to said outlet port and at least one control chamber;

a reciprocable proportional spool mounted in said housing and at said first passageway for alternately permitting fluid to flow from said inlet port to said outlet port in a first position thereof and preventing the flow of fluid from said inlet port to said outlet port in a second position thereof, said reciprocable proportional spool having a first end surface of a first diameter and a second end surface of a second, larger diameter;

a second fluid passageway in said housing permitting fluid at the pressure at said outlet port to flow to said control chamber;

said reciprocable proportional spool having said first end surface thereof exposed to the fluid at the pressure of the fluid at said inlet port and having said second end surface thereof exposed to the fluid at the pressure of the fluid at said outlet port for moving said spool toward said second position thereof and brake pressure controlling means including a reciprocable plunger actuable by said load variable means and hence, by the load on said vehicle and resilient means acting between said plunger and said reciprocable proportional spool and engaging said reciprocable proportional spool for urging said reciprocable proportional spool toward said first position thereof permitting fluid to flow from said inlet port to said outlet port;

whereby the position of said reciprocable proportional spool, and hence, the fluid pressure at said outlet port, is determined by the relative diameters of said first and said second end surfaces, the fluid pressures in said control chamber and at said inlet port and the position of said plunger and hence, the load on said vehicle.

2. A valve as set forth in claim 1 wherein said second fluid passageway is in said reciprocable proportional spool which extends from adjacent said first end surface thereof to said second end surface thereof.

3. A valve as set forth in claim 2 further comprising a check valve mounted on said reciprocable proportional spool and permits fluid to flow from said second passageway to said inlet port.

4. A valve as set forth in claim 1 wherein said resilient means exerts a non-linear force on said reciprocable proportional spool, the force being smaller when said reciprocable plunger is in a position corresponding to a light load on said vehicle than the force when said reciprocable plunger is in a position corresponding to a heavy load on said vehicle.

5. A valve for continuously varying the pressure of fluid supplied to fluid operable braking apparatus on a vehicle in accordance with the load on said vehicle, said valve comprising:
  a housing having an inlet port for connection to a source of fluid under a predetermined pressure, an outlet port spaced from said outlet port for connection to fluid braking apparatus of said vehicle, a first fluid passageway extending from said inlet port to said outlet port and at least one control chamber;
  a reciprocable proportional spool having a first end surface of a first diameter and a second end surface of a larger, second diameter, said proportional spool being mounted in said housing with said first end surface thereof intermediate said inlet port and said outlet port and exposed to the fluid supplied to said inlet port and with said second end surface thereof intermediate said passageway and said control chamber and exposed to the fluid in said control chamber;
  fluid sealing means intermediate said inlet port and said outlet port and engageable with said reciprocable proportional spool for preventing the flow of fluid from said inlet port to said outlet port when said proportional spool is in a first position thereof;
  a second fluid passageway extending from intermediate said first end of said proportional spool and said outlet port to said control chamber and supplying fluid at the pressure of the fluid at said outlet port to said control chamber;
  a reciprocable plunger mounted on said housing and actuable in accordance with the load on a car; and
  resilient means acting between said plunger and said proportional spool and applying a force to said proportional spool urging said proportional spool out of said first position and into a second position in which fluid is free to flow from said inlet port to said outlet port;

whereby the ratio of the pressure of the fluid supplied to said braking apparatus to the pressure of the fluid supplied to said inlet port is dependent upon the fluid pressure in said control chamber, to the ratio of said second diameter of said second end of said proportional spool to said first diameter of said first end thereof and to the force applied to said proportional spool by said resilient means urging said proportional spool out of said first position.

6. A valve as set forth in claim 5 wherein said reciprocable proportional spool has a central bore therein extending from adjacent but spaced from said first end surface thereof to said second end surface thereof and wherein the end of said bore at said second end surface is in fluid communication with said control chamber.

7. A valve as set forth in claim 6 further comprising a check valve extending from said bore to the side of said fluid sealing means nearer said inlet port when said reciprocable proportional spool is in said first position and permitting fluid to flow from said bore to said inlet port.

8. A valve as set forth in claim 5 wherein said resilient means exerts a non-linear force on said reciprocable proportional spool, the force being smaller when said reciprocable plunger is in a position corresponding to a light load on said vehicle than the force when said reciprocable plunger is in a position corresponding to a heavy load on said vehicle.

9. A valve as set forth in claim 8 wherein said resilient means comprises a pair of compression springs, one of said springs exerting a smaller force than the other of said springs when compressed.

10. A valve as set forth in claim 5 wherein said housing has a bore having fluid communication with said inlet port and said outlet port, said reciprocable proportional spool is mounted in said bore, and said fluid sealing means encircles said bore, said bore forming at least part of said first fluid passageway.

11. A valve as set forth in claim 10 wherein said reciprocable proportional spool has an encircling groove communicating with the fluid at said outlet port and a bore communicating with said groove and extending to said second end surface and the end of said bore at said second end surface being in fluid communication with said control chamber, said groove and said bore forming at least part of said second fluid passageway.

* * * * *